March 4, 1952     A. R. OLSON     2,588,157

RELIEF VALVE

Filed April 19, 1946

INVENTOR.
A.R. OLSON

BY

Hudson and Young

ATTORNEYS

Patented Mar. 4, 1952

2,588,157

UNITED STATES PATENT OFFICE 2,588,157

RELIEF VALVE

Andrew R. Olson, Bartlesville, Okla., assignor to Phillips Petroleum Company, a corporation of Delaware Application April 19, 1946, Serial No. 663,469

4 Claims. (Cl. 137—53)

This invention relates to pressure relief valves. In one particular aspect, it relates to a novel valve closure arrangement wherein advantages of rigid valve seats are combined with advantages of resilient valve seats.

Valves comprising rigid valve heads and rigid valve seats may be made of metals or other durable material but require machining or grinding to very close tolerances and are prone to develop small leaks in service. Valves, wherein the closure is made by contact of a rigid valve head and a valve seat comprising compressible resilient material seal tightly, automatically adjust themselves to small variations in the rigid valve head but lack the durability of rigid valve seats. Failure of such valves is frequently caused by distortion of the compressible resilient valve seat and change in effective area. Failure is also frequently caused by resilient material sticking to a rigid valve head, especially in valves which are seldom opened such as pressure relief valves.

Pressure relief valves for tanks or other vessels for maintaining gases or vapors under pressure should seal tightly against leakage of confined materials, should be dependable in operation and should require service only at long intervals. A relief valve which combines the long-wearing and non-sticking qualities of rigid valve seats with the tight sealing qualities of a compressible, resilient valve seat is a highly desirable improvement.

It is an object of this invention to provide an improved pressure relief valve mechanism comprising in combination a rigid valve head, a rigid valve seat and a sealing member composed of flexible resilient material.

Another object is to provide an improved pressure relief valve comprising means for sealing the closed valve by pressure of confined fluid against a sealing member composed of a flexible resilient material.

Another object is to provide an improved pressure relief valve wherein pressure upon a sealing member made of flexible resilient material is limited to the pressure exerted thereon by confined fluid.

Another object is to provide an improved pressure relief valve which opens fully at a pressure very near the pressure causing initial leakage.

Another object is to provide a pressure relief valve mechanism which is simple, rugged and cheap in construction and which has the particular advantageous arrangement and combination of parts as shown.

Other objects and advantages will become apparent to those skilled in the art as this disclosure proceeds.

Drawings

Figure 1:
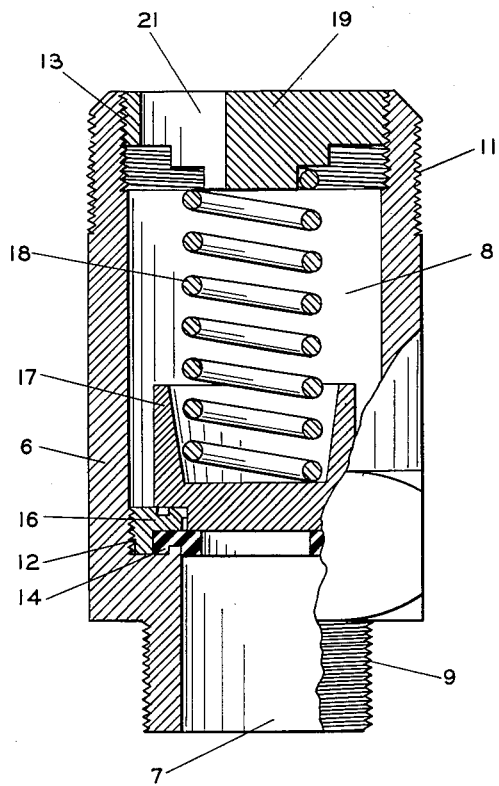
Figure 2:
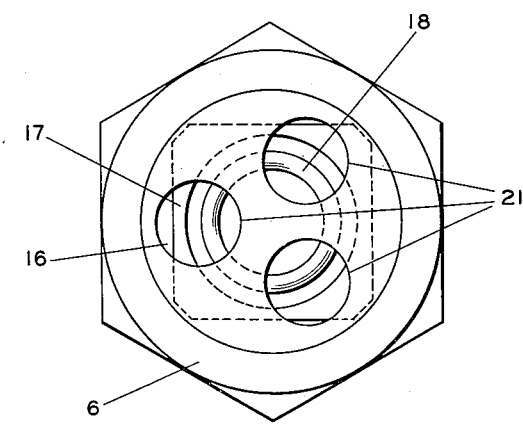

In the accompanying drawings, Fig. 1 shows diagrammatically one particular embodiment of my invention in vertical section. Fig. 2 is a plan of the same embodiment. Like numerals apply to like parts in both figures.

Referring thereto, a valve body 6 has a fluid conduit 7, 8 therethrough comprising a portion 7 of smaller diameter and a portion 8 of larger diameter. Said valve body has threaded external portions 9 and 11 at opposite ends and has internal threaded portions 12 and 13 at opposite ends of portion 8 of said conduit.

An annular sealing member 14 composed of flexible, resilient material is disposed within said conduit adjacent to portion 7. A threaded, annular, rigid valve seat 16 is disposed in said conduit adjacent to sealing member 14 and partially overlapping the same. Valve seat 16 is held in place by engagement of its threads with the threads 12 of body 6 and holds sealing member 14 firmly clamped between the rigid valve seat and the valve body.

A moveable rigid valve head 17 is disposed in portion 8 of said conduit and is adapted to be moved to seat on said rigid valve seat and to touch, but exert substantially no pressure on sealing member 14, and thereby substantially close said conduit. Valve head 17 has a substantially cylindrical portion adapted to fit loosely into the annular valve seat 16 and to enter into sealing relation with sealing member 14, and an upper portion, in cross section substantially square, with rounded corners.

A pressure member 18 is disposed within portion 8 of said conduit and is adapted to maintain pressure on valve head 17 tending to force the valve head to seat on valve seat 16. Threaded end member 19 having outlet ports 21 is disposed across the end of conduit 8, supports pressure member 18 and is held in place by engagement of its threads with threads 13 of body 6.

Operation

The valve is attached by threads 9 to a pressure vessel (not shown) so that portion 7 of the conduit communicates with fluid under pressure in the interior of said vessel. If desired, a pipe (not shown) may be attached to threaded portion 11 to carry off any fluid vented when the valve is open.

Under conditions of normal pressure fluid under pressure is retained by the closed valve. In closed position, valve head 17 is seated firmly on valve seat 16 by pressure of member 18. Valve seat 16 limits the travel of the valve head at a point where the valve head just touches but exerts substantially no pressure on sealing member 14. When a leak develops between the valve head and rigid valve seat, pressure of confined fluid forces the sealing member against juncture of the valve seat and the valve head and seals the leak. Since only a small area of the sealing member is compressed against said juncture and the pressure thereon is limited to that exerted by the confined fluid, distortion and sticking are minimized.

When the pressure of confined fluid on valve head 17 exceeds the pressure from member 18, the valve head is forced up off valve seat 16, opening the conduit. Fluid escapes through conduit portion 7, around valve head 17, through portion 8 and through outlet ports 21 until excess pressure is relieved. Member 18 then forces the valve head back to its seated position on the valve seat and the sealing member is forced by fluid pressure against the juncture of valve head and valve seat to seal any leaks.

The rounded corners of the square upper portion of the valve head slide upon the inside walls of conduit 8 and act as guiding members to guide the valve head to seat on the rigid valve seat.

The end member 19 also acts as a means for controlling pressure. By turning, this member may be moved up or down the threaded portion 13 of body 6 thus decreasing or increasing the pressure exerted on the valve head by member 18.

The novel construction of this relief valve results in improved operation especially due to the relationship of the pressures required to cause initial leak, full opening and reseating of the valve. When pressure increases in that portion 7 of the conduit below valve head 17 to an amount sufficient to cause initial leakage in a valve of conventional design, valve head 17 is seated loosely on valve seat 16 but no leak develops because sealing member 14 is still forced against the valve head by pressure confined in the conduit. Sealing relationship is thus maintained until the valve head is moved through a distance sufficient to break contact between the valve head and sealing member. In reseating, sealing member 14 quickly seals the valve when the valve head is still loosely seated on the rigid valve seat.

Average of results obtainable with valves of this type constructed to open at 375 pounds per square inch are as follows:

|  | New Valve | After 6 Months |
| --- | --- | --- |
|  | P. s. i. | P. s. i. |
| Initial leak | 375 | 382 |
| Full opening | 382 | 390 |
| Reseat minimum | 373 | 362 |

The following average results are obtained on subjecting a group of conventional valves to the same test conditions:

|  | New Valve | After 6 Months |
| --- | --- | --- |
|  | P. s. i. | P. s. i. |
| Initial Leak | 390 | 450 |
| Full Opening | 410 | 485 |
| Reseat Minimum | 325 | 285 |

It is therefore evident that the relief valve shown is an improvement over pressure relief valves of conventional construction. The valve shown is therefore preferable to the prior art for use with liquid petroleum gas since there is less leakage before the relief pressure is reached and quicker closing of the valve when safe pressure is again attained; thus preventing unnecessary waste of gas.

Pressure member 18 may be any well-known mechanical means for exerting pressure such as a weighted rod, a spring under tension installed beneath valve head 17, or other conventional means.

Many other obvious variations in structure may be made by those skilled in the art without departing from the spirit or substance of the invention, the scope of which is commensurate with the appended claims.

Having described my invention and explained its operation, I claim:

1. A pressure relief valve comprising in combination: a valve body comprising a smaller cylindrical portion threaded externally, and continuous therewith a larger substantially cylindrical portion threaded externally and internally at the end opposite said smaller cylindrical portion and threaded internally at the end adjacent to said smaller portion, said body having a fluid conduit therethrough comprising a portion of smaller cross section and a portion of larger cross section; an annular, rigid valve seat, threaded on its periphery and disposed in said conduit adjacent to said portion of smaller cross section with its threads engaging said internally threaded body portion thereat; a rigid, moveable valve head comprising a lower, substantially cylindrical portion adapted so as to fit loosely within said annular valve seat and extend substantially therethrough and an upper portion substantially square in cross section with rounded corners adapted to seat on said valve seat, and to fit slideably in said larger portion of said conduit; an end member containing outlet ports, rigidly affixed in the downstream end of said fluid conduit; a coil spring extending between said end member and said valve head so as to maintain pressure on said valve head to seat the same on said seat; and an annular sealing member composed of flexible, resilient material, having an inner diameter smaller than said fluid conduit, maintained in position by and disposed in said conduit adjacent to said valve seat.

2. A pressure relief valve comprising in combination a valve body adapted to be affixed in a pressurized fluid containing vessel and forming a continuous longitudinal conduit therethrough, the downstream end portion of said conduit being larger in diameter than the upstream portion thereof; an annular flexible resilient member disposed in said valve body within the enlarged conduit portion, adjacent said smaller conduit portion and extending laterally into said smaller conduit portion; an annular valve seat affixed in said larger conduit portion, having an interior diameter larger than said flexible resilient member, and affixing said flexible resilient member in place; a valve head within said enlarged conduit portion having a seating surface adapted so as to seat upon said valve seat and having an extended portion extending downwardly through said valve seat the thickness of said valve seat; and a mechanical pressure means operatively connected to said valve head and adapted so as to apply sufficient pressure thereto to seat said valve head on said valve seat.

3. A pressure relief valve comprising in combination a valve body having a fluid conduit therethrough; a rigid valve seat in said conduit; an annular flexible sealing member having an inner diameter smaller than said conduit, affixed in said conduit upstream but adjacent said rigid valve seat; a rigid valve head slidably disposed in said conduit and moveable to seat on and extend partially through said rigid valve seat so as to closely approximate said annular flexible sealing member; and mechanical pressure means operatively connected to said valve head and adapted so as to apply sufficient pressure thereto to seat said valve head on said valve seat.

4. The pressure relief valve of claim 3, wherein said mechanical pressure means comprises a compression spring.

ANDREW R. OLSON.

REFERENCES CITED

The following references are of record in the file of this patent:

UNITED STATES PATENTS

| Number | Name | Date |
|---|---|---|
| 1,758,211 | Allen | May 13, 1930 |
| 2,145,870 | Gentzel | Feb. 7, 1939 |
| 2,163,472 | Shimer | June 20, 1939 |
| 2,194,541 | Buttner | Mar. 26, 1940 |
| 2,223,651 | White | Dec. 3, 1940 |
| 2,254,209 | Buttner | Sept. 2, 1941 |
| 2,322,139 | Kaelin | June 15, 1943 |
| 2,366,520 | Griffith | Jan. 2, 1945 |

FOREIGN PATENTS

| Number | Country | Date |
|---|---|---|
| 857 | Great Britain | Mar. 3, 1877 |